United States Patent [19]

Weisenfelder

[11] Patent Number: 4,683,994

[45] Date of Patent: Aug. 4, 1987

[54] SHIFTING APPARATUS FOR A DRAWWORKS TRANSMISSION

[75] Inventor: Carl H. Weisenfelder, Beaumont, Tex.

[73] Assignee: IRI International Corporation, Pampa, Tex.

[21] Appl. No.: 722,887

[22] Filed: Apr. 12, 1985

[51] Int. Cl.[4] ........................ F16D 67/04; F16D 47/06

[52] U.S. Cl. ................................ 192/3.61; 192/87.19; 192/114 R; 192/0.094; 254/311; 254/317

[58] Field of Search ............... 192/48.91, 85 C, 87.14, 192/87.18, 87.19, 0.094, 114 R, 3.51, 145, 12 C, 361; 254/358, 365, 311, 317; 74/475

[56] References Cited

U.S. PATENT DOCUMENTS

| | | | |
|---|---|---|---|
| 2,092,580 | 9/1937 | Kelley | 192/87 |
| 2,180,154 | 11/1939 | Lenz | 192/87 |
| 2,315,157 | 3/1943 | Maier | 254/187 |
| 2,398,407 | 4/1946 | Brownyer | 192/87.14 |
| 2,703,161 | 3/1955 | Keim et al. | 192/4 R |
| 2,703,162 | 3/1965 | Keim et al. | 192/12 |
| 2,785,783 | 3/1957 | Homrig et al. | 192/114 R |
| 2,832,234 | 4/1958 | Sinclair | 192/48.91 |
| 3,001,413 | 9/1961 | Burckhardt | 192/114 R |
| 3,244,404 | 4/1966 | Bender | 254/317 |
| 3,459,285 | 8/1969 | Lamburn et al. | 192/114 R |
| 4,232,564 | 11/1980 | Yamasaki | 74/475 |
| 4,429,591 | 2/1984 | Zuch et al. | 192/114 R |

FOREIGN PATENT DOCUMENTS

| | | | |
|---|---|---|---|
| 0075354 | 7/1930 | Sweden | 192/87.18 |

*Primary Examiner*—Martin G. Belisario

[57] ABSTRACT

Drawworks transmission shifting apparatus is described that provides an arrangement of control valves, cylinders, clutches and brakes which permit the rig operator to shift the drawworks transmission into the desired setting and to lock the transmission in those positions by the use of remotely controlled pneumatically powered cylinders.

10 Claims, 8 Drawing Figures

SHIFTING APPARATUS FOR A DRAWWORKS TRANSMISSION

BACKGROUND OF THE INVENTION

This invention relates generally to improvements in transmissions for the drawworks of drilling rigs.

More specifically, but not by way of limitation, this invention relates to an improved shifting apparatus for a drawworks transmission wherein the transmission includes at least a high, low and neutral position, and wherein the transmission is locked in each of the positions.

As oilwell drilling rigs have developed over the last several years, they have become much larger and have become dispersed over a relatively large area. In the case of portable rigs, for example, rigs that have been developed for helicopter transport, various rig components are totally separate and even when assembled remain fairly widely dispersed. The drawworks, that is the hoisting apparatus utilized to move the pipe into and out of the well, is located generally on the rig floor while the engines for driving the drawworks may be located at some remote lccation.

U.S. Pat. No. 2,704,653, issued Mar. 22, 1955 to D. M. Duncan illustrates a rotary and drawworks drive system utilized in one type of drilling rig. U.S. Pat. No. 3,981,485 issued Sept. 21, 1976 to K. H. Eddy et al illustrates a helicopter portable drilling rig and the drive system utilized therein.

The number of engines utilized to drive the turntable and the drawworks, has been increasing over the years so that now, many engines are compounded to provide the desired horsepower. Further, the operator of the rig can not be located close to all the rig apparatus. Accordingly, to be able to control the engines and the transmissions linking the engines with apparatus on the drilling rig floor from a remote location, it has become necessary to provide controls for the rig components that can be operated from remote locations.

Remote mechanical shifting of the drawworks transmission, engagement and disengagement of clutches and brakes for the engines and the drawworks, has been accomplished through the extensive use of flexible cables and other mechanical linkages. In such instances, extreme distances become very difficult and even in relatively close proximity installations, a great deal of care must be utilized to be certain that the cables are not placed in a position that would hamper the operation thereof.

Hydraulic mechanisms have also been utilized to control the clutches and brakes and to shift the transmissions. However, such hydraulic installations necessitate the use of a special hydraulic pump and some means for driving the pump which requires additional equipment, expense and maintenance.

Drilling rigs are almost always equipped with compressors so that a source of pressurized air is readily available.

SUMMARY OF THE INVENTION

It is an object of this invention to provide an improved shifting apparatus for a drawworks transmission that utilizes the readily available pressurized air to provide a simple and relatively inexpensive system for controlling the transmission and brakes and clutches related thereto.

Accordingly, this invention provides an improved shifting apparatus for a drawworks transmission wherein the drawworks is driven by at least one engine having a remotely actuated engine clutch and that includes a remotely actuated drawworks brake. The improved shifting apparatus comprises: a rotatable transmission shaft that is driven by the engine; a clutch member mounted on the shaft and that is movable axially thereon and rotatable therewith; and a low speed input member that is rotatable on the shaft and located adjacent to the clutch member. The low speed input member includes a clutch portion that is engageable with the clutch member and the low speed input member is operably connected with the drawworks. A high speed input member is rotatable on the shaft and also located adjacent to the clutch member. The high speed input member includes a clutch portion that is engageable with the clutch member and is operably connected with the drawworks. Shifting apparatus is provided that moves the clutch member from a first position wherein the clutch member is not engaging either clutch portion, to a second position wherein the input member engages the clutch portion on the low speed output member to drive the drawworks at one speed, and to a third position wherein the clutch member engages the clutch portion on the high speed input member to drive the drawworks at a relatively higher speed. Retainer apparatus is also provided that retains the shifting apparatus in each of the three positions.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
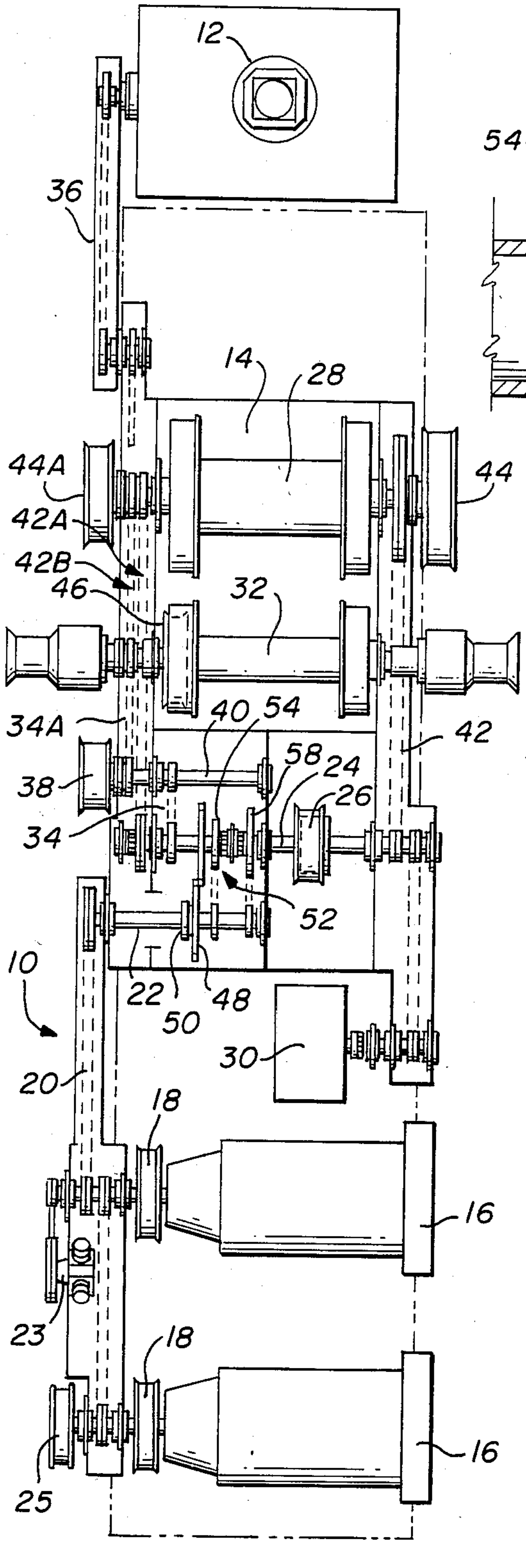
FIG. 1 is a top plan view of an arrangement of apparatus utilized to drive a rotary table and drawworks by a pair of engines through a transmission that is constructed in accordance with the invention.

Referring to the drawing, and to FIG. 1 in particular, shown therein and generally designated by the reference character 10, is a somewhat schematic drawing illustrating apparatus used for driving a rotary table 12 and a drawworks 14. The apparatus 10, in addition to the rotary 12 and drawworks 14, includes a plurality of engines 16 that are appropriately compounded to provide the necessary horsepower for driving the rotary and drawworks.

Each of the engines 16 is provided with a clutch 18 on its output shaft. The engines are connected by chain drive 20 to a transmission input shaft 22. An air compressor 23 is driven by the engines 16 to provide pressurized air for use on the drilling rig (not shown) with which the apparatus 10 is used. An inertia brake 25 is utilized to stop rotation before shifting.

The transmission input shaft 22 is connected by an appropriate drive, such as chains or gears, to a transmission output shaft 24. The output shaft 24 is connected through a clutch 26, chain 42 and clutch 44 with a main or low cable drum 28 and with an auxiliary brake 30. The main drive 28 may also be driven at a different ratio through chain 42A and clutch 44A. The low cable drum 28 comprises one of two cable drums or reels comprising part of the drawworks 14. An upper drum or sandline drum 32 is driven by the output shaft 24 through a chain drive 42A and 42B. The rotary table 12 is driven through chain drives 34, 34A and 36 via clutch 38 and rotary drive shaft 40.

The main drum 28 of the drawworks 14, the rotary 12, and the upper or sandline drum 32 are driven by and the speed thereof is controlled by the speed of the transmission output shaft 24. The determination of which of the drums is rotating is made by a main drum clutch 44 or by clutch 44A and by sandline drum clutch 46. The previously mentioned brake 30 functions to retard rotation of the main drum 28 when the clutch 26 is in the disengaged position. The direction of rotation of the drums 28 and 32 is controlled through the transmission by a reversing gear set 48 and a reverse clutch 50.

Figure 4:
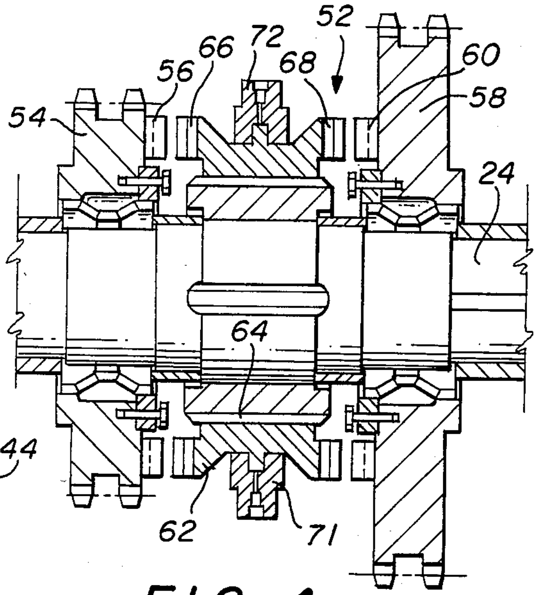
FIG. 4 is an enlarged, fragmentary crosssectional view showing a portion of the clutch utilized in the drawworks transmission illustrated in FIG. 2.
Figure 2:
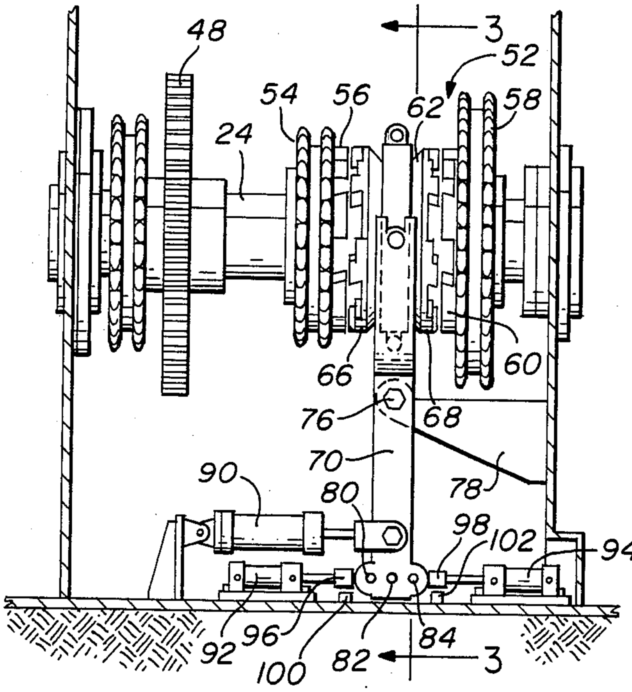
FIG. 2 is an enlarged, vertical elevation of a portion of the drawworks transmission which is constructed in accordance with the invention.
Figure 3:
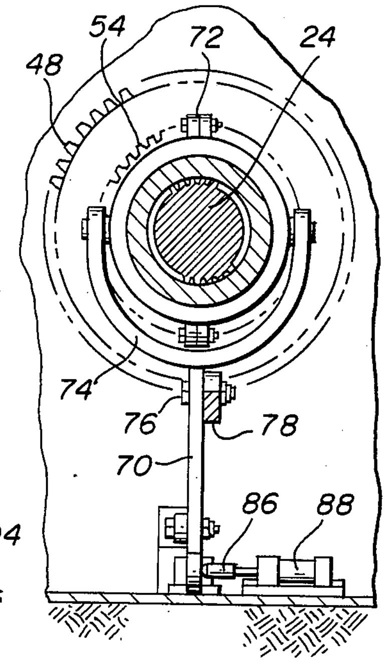
FIG. 3 is a cross-sectional view taken generally along the line 3—3 of FIG. 2.

The speed of rotation of the output shaft 24 and thus the speed of the drums 28 and 32 is controlled by a transmission clutch, generally designated by the reference character 52 and more clearly shown in FIGS. 2, 3 and 4. A high speed sprocket 54 is located for rotation on the transmission output shaft 24 and includes a clutch portion 56. A low speed sprocket 58 is also located on the shaft 24 in spaced relation to the high speed sprocket 54. The low speed sprocket 58 also includes a clutch portion 60 thereon. Both sprockets are rotatably located on the shaft 24.

As can be seen in FIG. 4, the sprockets 54 and 58 are spaced on the shaft 24 with a clutch member 62 mounted on the shaft 24 therebetween. The clutch member 62 is movable longitudinally along the shaft 24 by virtue of the spline arrangement 64. The arrangement is such that the clutch member 62 rotates with the shaft 24, but is slidable therealong.

The clutch member 62 also includes a clutch portion 66 that is engageable with the clutch portion 56 on the high speed sprocket 54 so that the rotation of the sprocket 54 is transmitted to the shaft 24 through the clutch member 62 when the clutch portions 56 and 66 are in engagement. Also, the clutch member 66 includes a clutch portion 68 that is engageable with the clutch portion 60 on the low speed sprocket when the clutch member 62 is shifted into engagement therewith so that the rotation of the sprocket 58 is transmitted to the shaft 24.

As illustrated, clutch member 62 does not engage both the sprocket 54 and the sprocket 58 simultaneously. The member 62 is disposed in an intermediate position where it is not in engagement with either of the sprockets. The three positions of the clutch member 62 may be described as a 'neutral' position when neither of the sprockets is engaged, a low speed' position when the clutch member 62 engages the low speed sprocket 58, and a 'high speed' position when the clutch member 62 engages the high speed sprocket 54.

To move the clutch member 62 through the three positions, the clutch member is provided with a shifting lever 70 which may be more clearly seen in FIGS. 2 and 3. The shifting lever 70 includes a split ring 72 that is located in encircling relationship to the clutch member 62 and is rotatable thereon. The split ring 72 is attached to a yoke 74 which is pivoted at 76 on a bracket 78.

In FIGS. 2 and 3, it can be seen that the lower end of the lever 70 is provided with three latch holes 80, 82 and 84. The holes are sized to receive a latch plunger 86 mounted on the end of the piston in the double-acting latch cylinder 88. It will be understood that the plunger 86 will enter the hole 80, 82 or 84 which is positioned immediately in front of the plunger 86 when the clutch 52 has been located in one of the three previously described positions.

Figure 7:
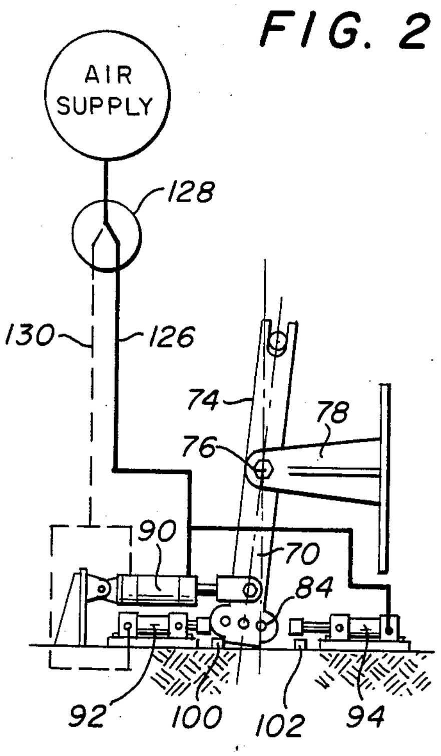
FIG. 7 is a view similar to FIG. 6, but illustrating the shifting mechanism in one operating position.
Figure 8:
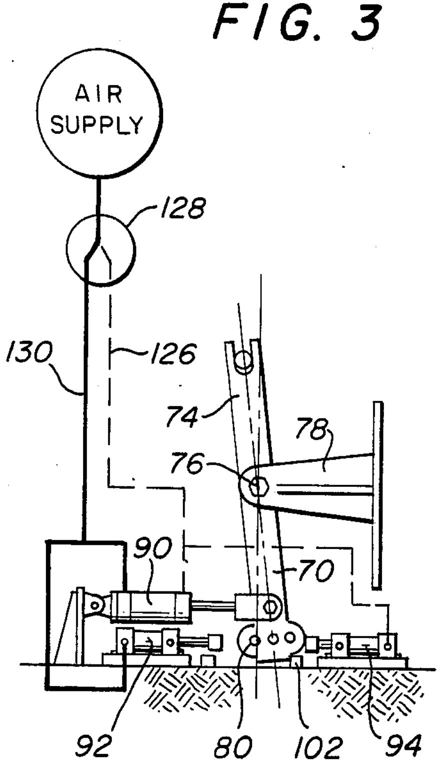
FIG. 8 is another view similar to FIG. 6, but illustrating the shifting mechanism in another operating position.

Pivotal movement of the shifting lever 70 about the pivot 76 occurs as a result of actuating a double-acting, main shift cylinder 90. In the neutral position of the clutch member 62 and of the lever 70, cylinders 92 and 94, which are located in opposition, are actuated so that the pistons 96 and 98 therein, respectively, engage the lower end of the lever 70 and position the latch hole 82 in a position to receive the latch plunger 86. Accordingly, the transmission clutch 52 is locked in the neutral position. Stops 100 and 102 are provided that engage the lower end of the lever 70 and limit the movement of the lever 70 to the left, as seen in FIG. 7 and to the right, as seen in FIG. 8.

Figure 5:
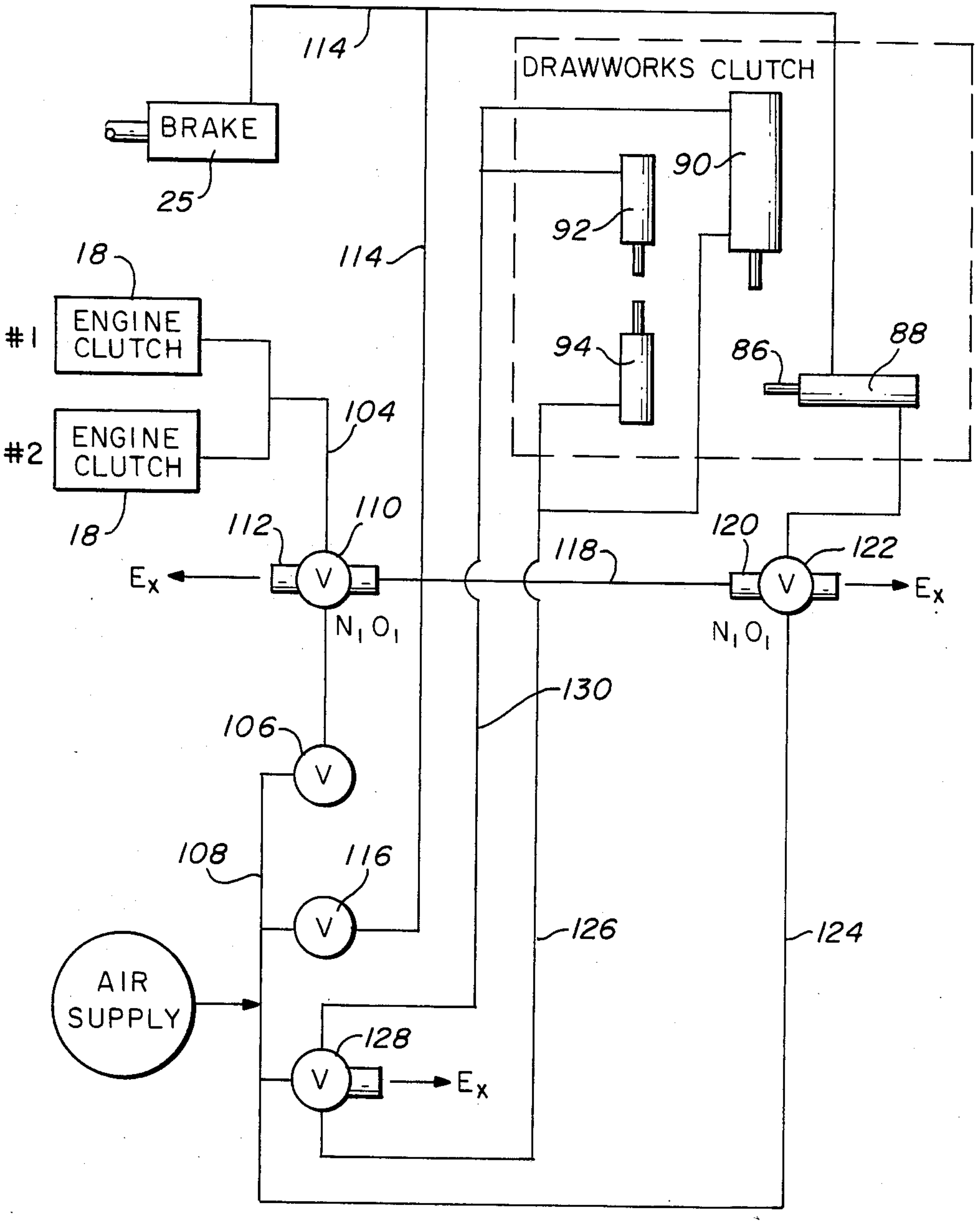
FIG. 5 is a schematic view illustrating the control system utilized to control the drawworks transmission.

FIG. 5 illustrates schematically the relationship of the various cylinders, brakes and clutches involved in transmission shifting apparatus that is constructed in accordance with the invention. As shown therein, the engine clutches 18 are connected by a conduit 104 with a control valve 106 which normally will be located in the driller's or operator's control stand. The valve 106 is connected by a conduit 108 with an air supply which may be the air compressor 23 or associated reservoirs (not shown), etc.

A normally open, pilot operated three-way valve 110 is located in the conduit 104. The valve 110 is arranged so that pressurized air from the valve 106 flows through the conduit 104 to the engine clutches 18 unless pressure is applied to the pilot portion of the valve, which causes air from the clutches 18 to exhaust through the exhaust port 112 of the valve.

A conduit 114 connects the brake 25 and the retract side of the double-acting cylinder 88 with the air supply conduit 108. A control valve 116 is located in the conduit 114 and is normally positioned in the driller's console, as was the control valve 106. When the valve 116 is open and pressure is applied through the conduit 114, a branch conduit 118 which extends therefrom to the pilot port of the valve 110, causes the valve to exhaust air from the clutches 18 as previously mentioned.

The branch conduit 118 also extends to a pilot port 120 of an additional three-way, pilot actuated valve 122. The valve 122 is interposed in a line 124 that extends from the air supply to the cylinder 88 to cause, when pressurized, the plunger 86 to engage and latch the lever 70 in the appropriate position. When air is supplied to the conduit 114 and branch conduit 118, the valve 122 is positioned to exhaust the pressurized air from the cylinder 88 permitting the latch plunger 86 to retract.

A conduit 126 extends from a control valve 128 to the cylinder 94 and to the retract side of the double-acting cylinder 90. The valve 128 is located in the driller's console and is connected with the air supply conduit 108. A second conduit 130 extends from the control valve 128 to the cylinder 92 and to the actuating side of the double-acting cylinder 90. The control valve 128 may further be described as being a three position control valve, that is, a valve wherein air is supplied through both the conduits 126 and 130 simultaneously, through the conduit 126 while exhausting air from the conduit 130, and through the conduit 130 while exhausting air from the conduit 126.

DESCRIPTION OF THE OPERATION

In operation, the apparatus 10 will, of course, be installed in a drilling rig (not shown). The engine 16 is in operation and, initially, with the clutches 18 disengaged by virtue of the open control valve 106.

Figure 6:
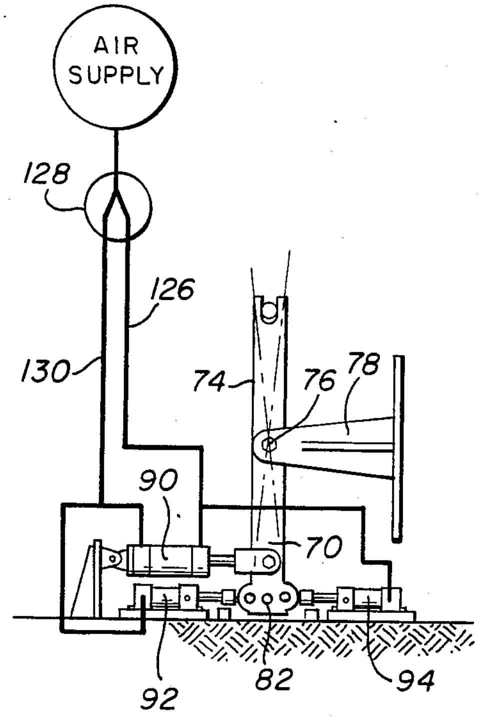
FIG. 6 is a somewhat schematic, side elevation of shifting mechanism utilized in the drawworks transmission.

Assuming initially that the transmission clutch 52 is in the neutral position as illustrated in FIG. 6, the control valve 128 is moved to a position wherein air is supplied through both the conduits 130 and 126 as shown by the heavy black lines in FIG. 6, so that the cylinders 94 and 92 are actuated, moving the lever 70 to the neutral position. The valve 122 is in the open position since there is no pressure in the conduit 118. The locking plunger 86 is moved into the hole 82 in the lever 70 locking the transmission clutch 52 in the neutral position. It will be noted that when in this position, and as illustrated in FIG. 6, pressure is applied through both of the conduits and thus applied on both sides of the double-acting cylinder 90 so that that cylinder 90 is for all practical purposes in a balanced condition.

With the clutches 18 engaged, power is transmitted through the chain drive 20 to the input shaft 22 so that the sprockets 54 and 58 are rotating, but no rotation of the transmission output shaft 24 occurs since the transmission clutch 52 is in the neutral position.

When it is desired to place the drawworks 14 in operation, the transmission clutch 52 is shifted by positioning the valve 128 into the high speed or low speed position. The transmission clutch 52 is shifted thereby to the high speed position as shown in FIG. 8, or the transmission clutch 52 is shifted to the low speed position as shown in FIG. 7.

Shifting to the low speed position as illustrated in FIG. 7 occurs when the valve 128 is shifted to a position wherein pressurized air is supplied through the conduit 126 and exhausted through the conduit 130. Pressure is applied to the actuating cylinder 90 in a direction to pull the lever 70 against the stop 100, as illustrated in FIG. 7. When this occurs, the cylinder 88 is again actuated, placing the locking plunger 86 in the hole 84 formed in the lower end of the lever 70, locking the clutch 52 in the low speed position.

With the clutch 52 in this position, the brake 25 is released and the clutch 26 applied, causing rotation of the drive chains 34, 34A, 42 and 42A. To actuate the desired one of the drums 28 or 30, either the clutch 44, 44A or the clutch 46 is actuated.

Shifting to the high speed position is caused by shifting the control valve 116 to a position applying the brake 25 and disengaging the locking plunger 86. Simultaneously therewith, the valve 128 is positioned so that pressurized air is supplied through the conduit 130 and exhausted from the conduit 126, as illustrated in FIG. 8. Pressurized air is supplied, as shown by the heavy line 130, to the side of the cylinder 90, causing the cylinder 90 to move the lever 70 against the stop 102. In this position, the hole 80 is positioned to receive the locking plunger 86. Once the shifting has been completed, the valve 116 is repositioned, cutting off the supply of air to the brake 25 and to the plunger 86, which then results in pressure being applied through the valve 122 to position the plunger 86 into the opening 80 and locking the lever 70 in the high speed position.

If it is desired to reverse the direction of rotation of the drawworks 14, reversal is accomplished by utilizing the clutch 50 to move the gear set 48 into engagement after the transmission clutch 52 has been placed in neutral. The transmission output shaft 24 is then driven in the opposite rotational direction.

From the foregoing, it can be appreciated that the shifting apparatus described in detail hereinbefore is capable of shifting the transmission from the high speed position, to a neutral position, to a low speed position and of locking the transmission positively in each of the described positions. In the arrangement described, the appropriate brakes and clutches are set by the control valves so that the shifting can take place remotely at the will and ease of the rig operator.

It will be understood that the foregoing detailed description is presented by way of example only and that many changes and modifications can be made thereto without departing from the spirit or scope of the invention.

What is claimed:

1. Improved shifting apparatus for a drawworks transmission wherein said drawworks is the driven element driven by at least one engine which is the drive element, said engine having a remotely actuated engine clutch and includes a remotely actuated drawworks brake, said improved shifting apparatus comprising in combination:

a rotatable transmission shaft operatively connected with one of said elements;

means journaling said shaft;

a clutch member mounted for limited axial movement on said shaft and rotatable therewith;

a low speed input member rotatable on said shaft adjacent to said clutch member, said low speed input member including a clutch portion engageable with said clutch member and being operably connected with said other element;

a high speed input member rotatable on said shaft adjacent to said clutch member, said high speed clutch member also including clutch portion engageable with said clutch member and being operably connected with said other element;

shift means for moving said clutch member from a first position wherein said clutch member is not engaging either clutch portion, to a second position wherein said clutch member engages the clutch portion on said low speed input member to drive said drawworks at a speed, and to a third position wherein said clutch member engages the clutch portion on said high speed input member to drive said drawworks at a relatively higher speed;

retainer means actuatable between a released position permitting said shift means to move said clutch member between said three positions and a retaining position for retaining said clutch member in each of said three positions;

means for actuating said retainer means between said released position and said retaining position independent of the shift means;

said shift means including;

a lever having one end operably connected to said clutch member;

means pivotally supporting said lever; and a cylinder connected to said lever for pivoting said lever to shift said clutch member among said positions;

wherein said retainer means includes cylinder actuated means for engaging said lever when said clutch member is in each said position when the retainer means is in the retaining position to prevent the lever from pivoting.

2. The shifting apparatus of claim 1 wherein said cylinder actuated means includes:

a first double acting fluid activated cylinder carrying a lock member for engaging and retaining said lever in each said position; and a pair of opposed fluid activated cylinders for positioning and retaining said lever with the clutch member in said first position.

3. The shifting apparatus of claim 2 wherein said lever has a plurality of holes sized to receive said lock member for positively retaining said lever in said positions.

4. The shifting apparatus of claim 3 and also including control means operably connected with said remotely actuated clutch, brake, shift means and retainer means for cooperatively actuating each.

5. The shifting apparatus of claim 4 wherein said control means includes:

a clutch control valve for actuating said engine clutch;

brake control valve means for actuating said brake, actuating said retainer means, and deactivating said engine clutch; and, a shift control valve for actuating said shift means to move said clutch member through said positions.

6. Improved shifting apparatus for a drawworks transmission wherein said drawworks is the driven element driven by at least one engine which is the drive element, said engine having a remotely actuated engine clutch and includes a remotely actuated drawworks brake, said improved shifting apparatus comprising in combination:

a rotatable transmission shaft operatively connected to one of said elments;

means journaling said shaft;

a clutch member mounted for limited axial movement on said shaft and rotatable therewith;

a low speed input member rotatable on said shaft adjacent to said cluth member, said low speed input member including a clutch portion engageable with said clutch member and being operably connected with said other element;

a high speed input member, rotatable on said shaft adjacent to said clutch member, said high speed clutch member also including a clutch portion engageable with said clutchmember and being operably connected with said other element;

shift means for moving said clutch member from a first position wherein said clutchmember is not engaging either clutch portion, to a second position wherein said clutch member engages the clutch portion on said low speed input member to drive said drawworks at a speed, and to a third position wherein said clutch member engages the clutch portion on said high speed input member to drive said drawworks at a relatively higher speed;

retainer means for retaining said shift means in each of said three positions;

control means operably connected with said remotely actuated clutch, brake, shift means and retainer means for cooperatively actuating each;

said control means including:

a clutch control valve for actuating said engine clutch;

brake control valve means for actuating said brake, actuating said retainer means, and deactivating said engine clutch; and a shift control valve for actuating said shift means to move said clutch member through said positions;

said brake control valve means including:

a normally open, pilot actuated clutch exhaust valve operably located between said clutch control valve and said clutch;

a normally open, pilot actuated retainer means exhaust valve operably connected with said retainer means; and a brake control valve for directing fluid to said brake to set said brake, to said retainer means exhuast valve for closing said retainer means exhaust valve releasing said retainer means, to said clutch exhaust valve to close said clutch exhaust valve to release said engine clutch, and to said retainer means for releasing said retainer means whereby said shift means can move said clutch member.

7. Improved shifting apparatus for a drawworks transmission wherein said drawworks is the driven element driven by at least one engine which is the drive element, said engine having a remotely actuated engine clutch and includes a remotely actuated drawworks brake, said improved shifting apparatus comprising in combination:

a rotatable transmission shaft operatively connected with one of said elements;

means journaling said shaft;

a clutch member mounted for limited axial movement on said shaft and rotatable therewith;

a low speed member rotatable on said shaft adjacent to said clutch member, said low speed input member including a clutch portion engageable with said clutch member and being operably connected with said other element;

a high speed input member rotatable on said shaft adjacent to said clutch member, said high speed clutch member also including a clutch portion engageable with said clutch member and being operably connected with said other element;

shift means for moving said clutch member from a first position wherein said clutch member is not engaging either clutch portion, to a second position wherein said clutch member engages the clutch portion on said low speed input member to drive said drawworks at a speed, and to a third position wherein said clutch member engages the clutch portion on said high speed input member to drive said drawworks at a relatively higher speed;

retainer means for retaining said shift means in each of said three positions;

said shift means including:

a lever having one end operably connected to said clutch member;

means pivotally supporting said lever; and a cylinder connected to said lever for pivoting said lever to shift said clutch member among said positions;

said retainer means including cylinder actuated means for engaging said lever when said clutch member is in each said position, said cylinder actuated means including:

a first cylinder carrying a lock member for engaging and retaining said lever in each said position; and a pair of opposed cylinders for positioning and retaining said lever in said first position;

said lever having a plurality of holes sized to receive said lock member for positively retaining said lever in said positions;

control means operably connected with said remotely actuated clutch, brake, shift means and retainer means for cooperatively actuated each, said control means including:

a clutch control valve for actuating said engine clutch;

brake control valve means for actuating said brake, actuating said retainer means, and deactivating said engine clutch; and a shift control valve for actuating said shift means to move said clutch member through said positions;

said brake control valve means including:

a normally open, pilot actuated clutch exhaust valve operably located between said clutch control valve and said clutch;

a normally open, pilot actuated retainer means exhaust valve operably connected with said retainer means; and a brake control valve for directing fluid to said brake to set said brake, to said retainer means exhaust valve for closing said retainer means exhaust valve releasing said retainer means, to said clutch exhaust valve to close said clutch exhaust valve to release said engine clutch, and to said retainer means for releasing said retainer means whereby said shift means can move said clutch member.

8. Improved control apparatus for shiftable drawworks transmission providing neutral, low speed, and high speed positions, the transmission having a brake and being driven by an engine having a clutch, said control apparatus comprising:

retainer means for holding said transmission in each of reach position;

a clutch control valve for actuating the engine clutch;

brake control valve means for actuating said brake, actuating said retainer means, and deactivating said engine clutch;

shift means for placing said transmission in one of said positions;

shift control valve means for actuating said shift means;

said brake control valve means including:

a normally open, pilot actuated clutch exhaust valve operably located between said clutch control valve and said clutch;

a normally open, pilot actuated retainer means exhaust valve operably connected with said retainer means; and, a brake control valve for directing fluid to said brake to set said brake, to said retainer means exhaust valve for closing said retainer means exhaust valve releasing said retainer means, to said clutch exhaust valve to close said clutch exhaust valve to release said engine clutch, and to said retainer means for releasing said retaining means whereby said shift means can move said clutch member.

9. The control appratus of claim 8 wherein said shift means includes:

a first cylinder for shifting said transmission between said low speed and high speed positions; and, second and third cylinders for shifting transmission to said neutral position.

10. The control apparatus of claim 9 wherein said shift means also includes means for limiting the travel of said first cylinder thereby locating said transmission in said high speed and low speed positions.

* * * * *